Nov. 23, 1965  F. A. HOWARD  3,219,092
SAFETY TIRE
Filed Aug. 16, 1963
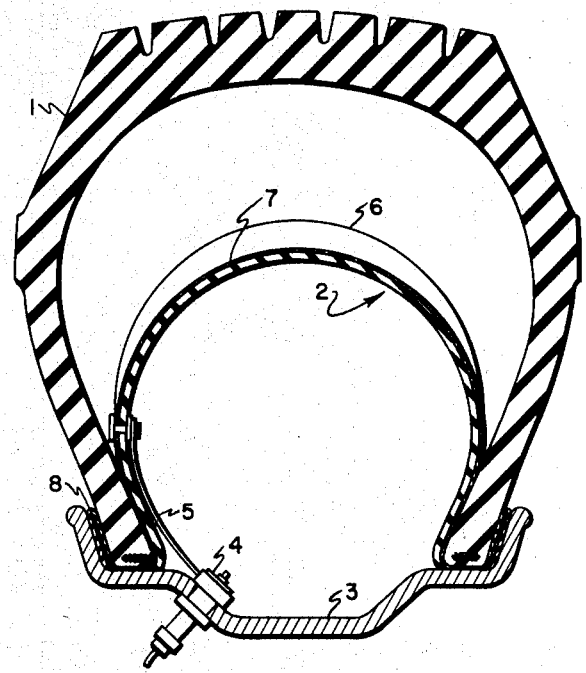
Figure 1
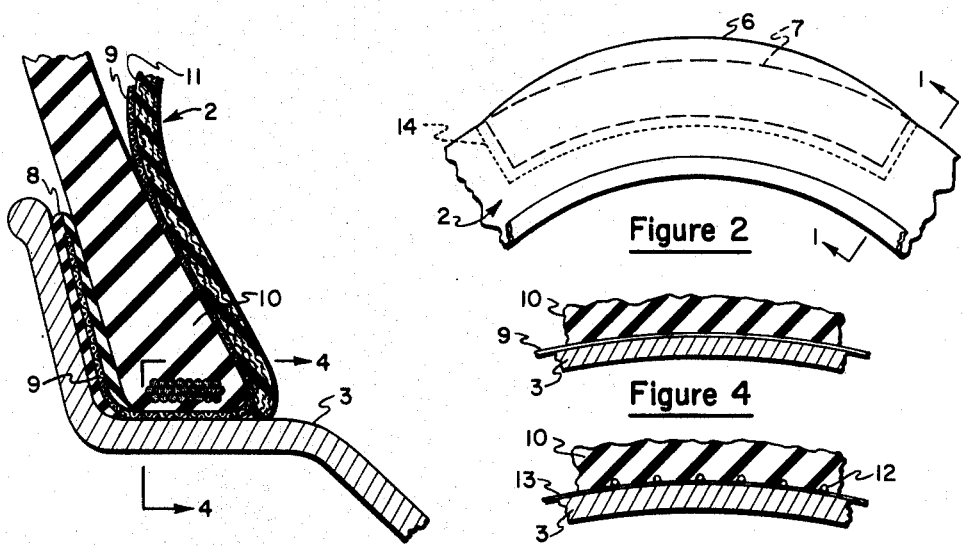
Figure 2
Figure 3
Figure 4
Figure 5
INVENTOR
FRANK A. HOWARD
BY
ATTORNEYS

United States Patent Office 3,219,092
Patented Nov. 23, 1965

3,219,092
SAFETY TIRE
Frank A. Howard, New York, N.Y.; Irma Amelia Howard, Frank A. Howard, Jr., and The Chase Manhattan Bank, executors of said Frank A. Howard, deceased
Filed Aug. 16, 1963, Ser. No. 302,578
10 Claims. (Cl. 152—340)

My invention relates to improvements in safety tires and more especially to a standard U-shaped tubeless pneumatic tire used in combination with an inner tire of smaller cross section. Such inner safety tires may take a number of different forms, one of which is that of flexible safety ring having the general cross section of the Greek capital letter Omega, as shown in my prior United States Patent No. 2,811,189. If such a combination is fitted with a dual valve, such as is shown in my prior United States Patent Nos. 3,065,763 and 2,969,824, the bleed hole in the ring may be omitted and the ring made sufficiently impervious to air so as to support the wheel and avoid further injury to the tire, at least for a moderate distance, i.e. 10 to 100 miles, after either a blowout or puncture of the casing. It is desirable, however, that in either case the driver should become immediately aware that he is runnning on the inner safety ring, so that he may keep to a moderate speed and repair or replace the casing at the earliest convenient opportunity. To accomplish this the flexible safety ring may be formed with an irregularity in its shape which will cause a noticeable vibration at each revolution of the wheel without interfering with the continued safe operation of the vehicle. Such a modified Omega-type safety ring is shown and described in this application.

One further problem associated with the widest and most successful use of this form of safety tire is that the side channels of the Omega ring in which the beads of the casing are seated necessarily increase slightly the effective diameter of the bead-seat portion of the rim and this tends to stretch the bead when the tire is mounted. Since it is very costly to preserve close tolerances of rim diameter and tire bead diameter in quantity production operations there may be some increased risk of breakage of beads from this stretching, where the tires are designed for especially tight fits over the rim bead seats. This problem may be met by the use of a flexible metal web for the bottom portion of the ring channels. For example, stainless steel has far greater tensile strength than nylon for equal cross section so the substitution of a steel web for a nylon web in the channel bottom greatly reduces the thickness required to carry the strain when the casing has become deflated and the ring is subject to the unbalanced inside pressure of perhaps 25 pounds or more per inch$^2$.

It is possible to eliminate any important bead-stretching tendency of the Omega-type safety ring by a still further modification of the design. In place of a nylon web or a continuous steel web of much less thickness, the stress may be carried by widely spaced fine steel wires. These very small spaced wires will easily embed themselves in the relatively soft face of the tire bead under moderate pressure, and as a result the stretching tendency is virtually eliminated.

The improvements, when carried out in the manner shown and described in this application, carry with them other advantages which can result in a lighter, cheaper and safer construction both for the Omega-type safety ring and for safety inner tires not anchored to the beads of the outer casing.

Referring first to the drawings, FIGURE 1 is a diagrammatic cross section through a standard U-shaped tubeless tire fitted on a standard drop-center steel rim and carrying an interposed Omega-type safety ring;

FIGURE 2 is a fragmentary perspective view of a portion of the ring showing an irregularity in the form of a bulge or hump in the outer contour of the ring;

FIGURE 3 is an enlarged fragmentary diagrammatic cross section of the bead portion of the assembly showing the use of a continuous metal web both as the bottom of the channel portion of the ring and as the outer surface of the ring itself;

FIGURE 4 is a section of the line 4—4 of FIGURE 3; and

FIGURE 5 is a similar section showing the use of spaced wires which embed themselves in the soft face of the bead when the tire is mounted.

Referring more particularly to the drawings, the numeral 1 designates a standard U-shaped tubeless tire casing which is mounted on a standard drop-center steel rim 3, and also carries an air impermeable Omega-type safety ring 2 forming an inner tire compartment. A dual valve 4, which may be of one of the forms shown in my prior patents referred to, permits selective direct inflation or deflation of the inner compartment and also selective direct inflation or deflation of the outer compartment between the ring and the tire, a flexible air conduit 5 being used to connect the valve with an opening through the ring.

In FIGURE 2 there is illustrated an irregularity in the shape of the outer portion of ring 2, this irregularity taking the form of a bulge 6 which causes the crown portion of the ring to extend outward beyond the normal circle of outer diameter which is most clearly shown by a dash line at 7 in FIGURE 2. Such a bulge may be created either by forming the ring integrally in this shape or by removing a section of the outer part of the ring and substituting a specially formed bulge section which is mechanically secured and hermetically sealed to the ring. The dotted lines 14 in FIGURE 2 indicate the margins of such a possible separate ring section applied over a cutaway portion of the ring, shown in dash lines 7, to provide the bulge. The bulge is shown in FIGURE 1 as it would appear if the section were taken on the line 1—1 of the diagrammatic fragmentary perspective view, FIGURE 2, the inner line 7 in FIGURE 1 representing the normal or regular cross section of the ring and the outer line 6, which departs markedly from the circular form in a cross section transverse to the axis of the ring, represents the bulged portion. It will be clear that in place of a bulge the irregularity in the outer portion of the ring could take the form of a depression in the crown of the ring made by reducing the outer diameter for a similar interval. If the casing is sufficiently deflated so the load is carried on the crown of the ring, there will be a bump effect or drop effect at each wheel revolution, to warn the driver that the safety ring is carrying the load.

Turning to FIGURE 3, the outer flange 8 of the ring channel is shown in section as made up of two rubber facings which are bonded to and overlie a thin, preferably air-impervious metal web 9. This web may be made of fine woven steel wire or of a sheet of wire cord in which the continuous warp filaments lie across the bead, axially of the rim. Since both of these forms of continuous steel web are air-permeable and it is desirable that they should be air-impermeable the separate wire filaments should be bonded with a suitable air-impermeable elastomer such as rubber, the bonding material serving only to fill any voids between the filaments without increasing the thickness of the web. The web 9 alone passes under the bead portion 10 of the casing and is of such small thickness that there is no risk of breakage of the bead in mounting or use of the tire if the bead has a normal fit on the rim.

In place of the metal web made of very fine steel wires or filaments there may be used a web made up of one or more plies of steel foil. As used herein the term "foil" is intended to define continuous sheets of uniform thickness so small as to give negligible stiffness or resistance to bending in any direction. Such foil can now be made in thicknesses measured in ten-thousandths of an inch, retaining or even increasing the high unit tensile strength of the steel from which it is rolled. For example, a web made of three separate plies of stainless steel foil of a thickness of about three ten thousandths of an inch each, has strength adequate for use in a common size tire, and is also reasonably flexible. By substituting additional plies of metal foil for the nylon plies 11, later described, the crown portion or entire mid-section of the ring may be further strengthened to the point that nail punctures become very rare, and at the same time the ring remains sufficiently flexible. The plies of metal foil used in the ring may be adhesively bonded by rubber coatings, either throughout their area or at locations sufficient only to hold the structure together, in order to minimize internal friction between plies resulting from deformation of the ring when it is carrying the load. Since the laminated metal foil construction is very strong and equally strong in all directions, an inner safety tire envelope so made does not have to be anchored to the beads of the outer casing, nor does it require separate strong beads of its own to resist the hoop and radial stresses which the aid pressure inside imposes upon any pneumatic tire. This laminated metal foil construction is, therefore, useful not only for the Omega-type inner safety ring but for any inner tire envelope used in an outer U-shaped tire casing of larger cross section.

However the mid-section may be constructed, the metal web 9 of an Omega-type ring should extend continuously over the outer surface of the body of the ring 2 to the opposite ring flange. This extremely thin metal layer may be reinforced in the mid-section of the ring and especially in the crown by one or more plies of rubberized nylon cord 11 which give body as well as strength to the ring. The continuous metal outer surface is especially desirable since it affords some additional protection against puncture and also reduces the friction between the ring and the inner face of the casing when the tire is run flat. It is customary to use a lubricant to further reduce this friction.

A further important refinement of the construction may be achieved by replacing the continuous metal web with widely spaced parallel wires 12, which run transversely of the ring, as shown in FIGURE 5. For example, these wires may be about one hundredth of an inch in diameter, spaced apart about one tenth of an inch. Because of this small diameter and relatively wide spacing the wires will easily become completely embedded in the opposed thin soft face of the bead 10, as shown in FIGURE 5, when the tire is mounted on the rim 3, and the bead-stretching effect will be virtually eliminated while the wires 12 extending continuously from one flange to the other will safely transmit the stress of the inflated ring to the tire bead 10 when the pressure falls in the tire. For convenience in assembling the ring the wires 12 may be adhered to an extremely thin sheet or film of air-impervious fabric or plastic designated 13, this composite structure replacing the continuous metal web 9 first described and shown in FIGURES 1, 3 and 4, and serving both to anchor the ring to the tire bead and to prevent leakage of air from the inner chamber within the ring into the outer chamber between the tire and ring.

By means of the improvements described, the Omega-type safety ring of my prior patent becomes better adapted to the widest use as a means of protecting life and property by eliminating the traffic hazard created by tire blowouts, and also greatly reducing the inconvenience and delay resulting from roadside tire changes from punctures. The improved ring can be fitted into any standard tubeless tire used on a standard rim. The thickness of the steel web interposed between the tire bead and the bead-seat of the rim is so small that the danger of breaking tire beads is avoided. This web, if continued around the crown of the ring, also reduces the friction between ring and casing when running flat and adds to the resistance of the ring to puncturing. The irregularity in the shape of the outer portion of the ring gives notice to the driver when the casing of the tire is flat and running on the ring, and this makes it possible to use a lighter and cheaper ring construction since it is no longer necessary to provide the strength and durability of ring need for long mileage at high speeds.

While I have shown and described in detail the new structural features which characterize the present invention it will be understood that this is only for the purpose of making the invention clear, and that it is not to be regarded as limited to any of these details save in so far as such limitations are included within the terms of the appended claims in which it is my intention to claim all novelty inherent in this invention.

What I claim is:

1. An improved Omega-type safety ring having side channels adapted to be interposed between the tire bead and the rim, the bottom of said channels being made essentially only of a web of flexible metal foil of high tensile strength, said web being continued into the center of and bonded to an outer ring flange, of relatively greater thickness and of elastomeric material capable of forming an air seal both against the outside of the tire bead and the inside of the rim flange, and also continuing onto and bonded to the outer surface of the body portion of the ring.

2. A safety ring forming, with the rim, a complete envelope for an inner tire compartment for use within an outer U-shaped tubeless tire casing of the same rim diameter but larger cross section, said ring being a flexible puncture-resisting assembly of a plurality of laminations of metal foil bonded to one another by an elastic adhesive.

3. An improved Omega-type safety ring having side channels adapted to be interposed between a tire bead and a rim, the bottom of said channels being made essentially only of a web of flexible metal cord fabric with its continuous warp filaments running axially of the rim and its voids filled with a flexible air-sealing material and being of high tensile strength, said web being continued into the center of and bonded to an outer ring flange, of relatively greater thickness than said web and of elastomeric material capable of forming an air seal both against the outside of a tire bead and the inside of a rim flange, and also continuing onto and bonded to the outer surface of the body portion of the ring.

4. An improved Omega-type safety ring having side channels adapted to be interposed between a tire bead and a rim, the bottom of said channels being made essentially only of a web of flexible, fine metal wires running only axially of the rim and well spaced apart so that they may separately embed themselves in the opposed soft face of the bead, said web being continued into the center of and bonded to an outer ring flange, of relatively greater thickness than said web and of elastomeric material capable of forming an air seal both against the outside of a tire bead and the inside of a rim flange, and also continuing onto and bonded to the outer surface of the body portion of the ring.

5. A ring as described in claim 4 in which the wires are bonded to an underlying extremely thin flexible air-impermeable sheet.

6. In combination, a U-shaped tubeless tire, a rim whereon said tire is carried, and a safety ring enclosed within said tire to form a separate inner tire compartment, said ring having an air-impermeable body of the same internal diameter as the outer diameter of the portion of said rim whereon said tubeless tire is carried and an outside diameter substantially less than the inside diameter of the outer portion of said tire so as to permit said tire to deform substantially under load without bearing on said ring, and the outer body portion of said ring carrying a puncture-resistant flexible assembly of a plurality of layers of metal foil.

7. A safety ring adapted to be disposed within the annular region between a U-shaped tubeless tire and a rim whereon said tire is carried to form a separate inner tire compartment, said ring having an air-impermeable body and its outer body portion carrying a puncture-resistant flexible assembly of a plurality of layers of metal foil.

8. An improved Omega-type safety ring having side channels adapted to be interposed between a tire bead and a rim, the bottom of said channels being made essentially only of a web of a flexible plurality of separate plies of metal foil of high tensile strength, said web being continued into the center of and bonded to an outer ring flange, of relatively greater thickness than said web and of elastomeric material capable of forming an air seal both against the outside of a tire bead and the inside of a rim flange, and continuing onto and bonded to the outer body portion of the ring.

9. A ring as described in claim 8 in which the metal web extends continuously between one outer flange of the ring and the opposite outer flange.

10. A ring as described in claim 9 in which the midsection is strengthened by additional separate plies of metal foil to resist nail punctures while retaining flexibility.

References Cited by the Examiner

UNITED STATES PATENTS

| | | | |
|---|---|---|---|
| 1,420,392 | 6/1922 | Taylor | 152—156 X |
| 2,853,115 | 9/1958 | Church | 152—342 |
| 2,900,005 | 8/1959 | Riggs | 152—341 |
| 3,085,615 | 4/1963 | Sanderson | 152—340 |
| 3,145,754 | 8/1964 | Sarris | 152—342 |

ARTHUR L. LA POINT, *Primary Examiner.*